United States Patent [19]
Doerge et al.

[11] 3,758,638
[45] Sept. 11, 1973

[54] UNSATURATED POLYESTERS WITH REDUCED SMOKE LEVELS
[75] Inventors: Herman P. Doerge, Oakmont; Marco Wismer, Gibsonia, both of Pa.
[73] Assignee: PPG Industries, Inc., Pittsburgh, Pa.
[22] Filed: Oct. 26, 1971
[21] Appl. No.: 192,589

[52] U.S. Cl................. 260/865, 260/864, 260/866
[51] Int. Cl......................... C08f 43/00, C08f 43/02
[58] Field of Search........................... 260/865, 866

[56] References Cited
UNITED STATES PATENTS
2,635,089  4/1953  Anderson.......................... 260/45.85
2,664,413  12/1953  Parker ................................. 260/45.4

OTHER PUBLICATIONS
Boenig, Unsaturated Polyesters, Elsevier, New York, 1964, pages 181–182.

*Primary Examiner*—Melvin Goldstein
*Attorney*—Russell A. Eberly

[57] ABSTRACT

This invention relates to unsaturated polyester resins having reduced smoke levels and/or flame spread. The invention comprises incorporating particulate organic carboxylic acid into a polyester resin. Preferably the resin is a fire-retardant formulation and the presently-preferred carboxylic acid employed in particulate form is fumaric acid.

27 Claims, No Drawings

UNSATURATED POLYESTERS WITH REDUCED SMOKE LEVELS

STATE OF THE ART

Increasing attention has been placed on the amount of smoke generated by polyester resins, especially fire-retardant polyester resins. It is evident that even a polyester resin formulation having a low degree of fire hazard may create a hazard if the smoke released when the polyester is in contact with flame is sufficient to trap occupants in an enclosed space by obscuring their vision or hampering their ability to breathe. Methods have been developed for measuring this amount of smoke evolved, for example, see JOURNAL OF CELLULAR PLASTICS, January, 1967, pages 41–43. Likewise, the Underwriter's Laboratory has developed tests and ratings for measuring smoke evolution (for example UL E-84 tunnel tests, as well as UL 723).

DESCRIPTION OF THE INVENTION

It has now been found that particulate organic carboxylic acids and especially fumaric acid, when incorporated into a polyester resin formulation, especially a fire-retardant polyester resin formulation, reduces the amount of smoke generated by the polyester and/or reduces flame spread without substantially detracting from the polyester properties.

The term "unsaturated polyester" as utilized herein refers to unfoamed polyester compositions curable by free-radical catalysis which are well-known in the art and have numerous uses as coatings, castings, laminates and mouldings for decorative, functional and structural purposes.

The polyester resins of this invention having reduced smoke generation are virtually any polyester resin formulation formed from a mixture of a polyester of ethylenically unsaturated polycarboxylic acids and polyhydric alcohols and copolymerizable ethylenically unsaturated compounds, preferably a polyester formulation which is a fire-retardant formulation rendered fire-retardant by containing halogens, halogen atoms in the polyester structure, or containing phosphorus fire-retardant compounds, or preferably, containing both halogens in the molecular structure and phosphorus additives.

The polyester compositions of this invention are comprised of polyesters of ethylenically unsaturated polycarboxylic acids and polyhydric alcohols and copolymerizable ethylenically unsaturated compounds. Preferably the composition also contains an inhibitor.

As set forth above, the smoke suppressors of this invention function in cured free-radical catalyzed unsaturated polyester resins which are polymerizable mixtures of (a) a polyester of an ethylenically unsaturated polycarboxylic acid and a polyhydric alcohol and (b) a monomer containing a vinyl group. The ethylenically unsaturated polycarboxylic acids include such acids as: maleic acid, fumaric acid, aconitic acid, mesaconic acid, citraconic acid, itaconic acid, and halo and alkyl derivatives of such acids and the like; the preferred acid being maleic acid. The anhydrides of these acids, where the anhydrides exist, are, of course, embraced under the term "acid" since the polyesters obtained therefrom are essentially the same whether the acid or anhydride is utilized in the reaction. The ethylenically unsaturated dicarboxylic acids are conventionally employed in an amount of about 10 percent to about 100 mole percent, and preferably in an amount of about 20 mole percent to about 80 mole percent, of the total moles of acid component in the polyester.

Saturated dicarboxylic acids may be utilized in combination with the unsaturated acid or anhydride in the preparation of unsaturated polyester resins. Such acids increase the length of the polyester without adding additional crosslinking sites, which is a desired feature in some polyesters. Examples of useful dicarboxylic acids which are either saturated or only aromatically unsaturated include: succinic acid, adipic acid, suberic acid, azelaic acid, sebacic acid, phthalic acid, isophthalic acid, terephthalic acid, tetrachlorophthalic acid, hexachloroendomethylenetetrahydrophthalic acid, and the like. As in the case of the ethylenically unsaturated acids, the anhydrides of these acids, where the anhydrides exist, are embraced in the term acid. Furthermore, for purposes of the present invention, the aromatic nuclei of such acids as phthalic acid are generally regarded as saturated since the double bonds do not react by addition, as do ethylenic groups. Therefore, wherever the term "saturated dicarboxylic acid" is utilized, it is to be understood that such term includes the aromatic dicarboxylic acids. Such "saturated carboxylic acids" may also be referred to as "non-olefinically unsaturated" polycarboxylic acids.

The polyhydric alcohols useful in preparing unsaturated polyester resins include: ethylene glycol, diethylene glycol, triethylene glycol, polyethylene glycol, propylene glycol, dipropylene glycol, polypropylene glycol, glycerol, neopentyl glycol, pentaerythritol, trimethylol propane, trimethylol ethane and the like. The preferred polyols for the purpose of this invention have a molecular weight of less than about 2,000 and consist essentially of carbon, hydrogen and oxygen. The polyhydric alcohols are generally employed in an equal molar ratio to the total acid components, or as a slight excess, as, for example, about 5 mole percent excess.

Polymerizable ethylenically unsaturated compounds which crosslink with unsaturated polyesters to form thermosetting materials include such monomers as: styrene, alpha-methyl styrene, divinyl benzene, vinyl acetate, allyl acetate, diallyl phthalate, diallyl succinate, diallyl adipate, diallyl sebacate, methyl acrylate, methyl methacrylate, hexyl acrylate, octyl acrylate, octyl methacrylate, diallyl itaconate, diallyl maleate, diallyl fumarate, triallyl cyanurate, and the like. The preferred monomers are liquid compounds, soluble in the polyester components. Such monomers should preferably be free of non-aromatic carbon-carbon conjugated double bonds.

The monomer component or components may be employed over a broad range, but usually the proportion thereof, upon a weight basis, will be less than the polyester component. The amount of monomer is generally sufficient to provide a liquid, flowable, interpolymerizable mixture. Ordinarily, the percentage of monomer will fall within the range of about 10 percent to about 60 percent of the total weight of polyester and monomer. At the preferred range, the monomer is present in an amount of about 20 percent to about 50 percent.

Since the polyester component of the interpolymerizable mixture is often highly viscous or even solid at atmospheric temperatures, it is preferred to add the monomer thereto at a temperature sufficient to render the polyester satisfactorily fluid for incorporation with the monomer. This temperature is usually in the range of about 100°C. to about 120°C., which is sufficiently high, in the absence of gelation inhibitors, to induce premature gelation upon introduction of the monomer into the system. This is true even in the absence of free-radical catalysts.

Accordingly, it is preferred to include a gelation inhibitor in one or both components of the mixture. Suitable inhibitors may be selected from the quinonic or phenolic class or from a group of quaternary ammonium salts and amine salts, especially amine halide salts. Suitable inhibitors of the quinonic or phenolic class include: p-benzoquinone, chloranil, hydroquinone, 3-isopropyl catechol, 4-t-butyl catechol, 3-methyl catechol, 4-ethyl catechol, and 4-isopropyl catechol.

The following are representative examples of halide salts of amines which may be employed as inhibitors: trimethylamine hydrochloride, triethylamine hydrobromide, dimethylaniline hydrochloride, triethylamine hydrochloride, tri-n-butylamine hydrochloride, tribenzylamine hydrobromide, N-benzylaniline hydrochloride, and the like.

Useful quaternary ammonium salts include: trimethyl benzyl ammonium acid oxalate, trimethyl benzyl ammonium chloride, di(trimethyl benzyl ammonium)oxalate, trimethyl benzyl ammonium maleate, trimethyl benzyl ammonium tartrate, and the like. Other useful ammonium compounds and amine halide compounds are disclosed in U.S. Pat. 2,593,787 and 2,646,416, respectively.

The gelation inhibitor remains in the solution of polyester interpolymerizable monomer and acts as an inhibitor of gelation during subsequent storage of material before the latter is actually used. The amount of inhibitor required in the mixture during the mixing stage is susceptible to wide variation, but conventionally is in the range of about 0.001 percent to about 0.1 percent by weight, based upon the polyester component of the mixture. Interpolymerizable mixtures of polyesters of ethylenically unsaturated dicarboxylic acids and monomers containing an inhibitor, as above described, may be stored over substantial periods of time, for example, several weeks or even months, without premature gelation.

As previously stated, it is preferred that the polyester formulation be a fire-retardant polyester formulation. This is typically achieved by employing as the polyester (a), defined above, a halogenated polycarboxylic acid or anhydride, the carboxylic compounds may be aliphatic, cycloaliphatic, aromatic, heterocyclic and either saturated or unsaturated. Amont the halogenated polycarboxylic compounds which can be used are tetrachlorophthalic acid, tetrabromophthalic acid, the DielsAlder adducts of hexahalocyclopentadiene and polycarboxylic compounds wherein the halogen is selected from the group consisting of chlorine, bromine, fluorine and mixtures thereof. Preferably, the polyester should contain at least about 10 to about 60 percent and preferably about 20 to about 50 percent by weight of halogen.

Fire-retardant polyester formulations, as defined in this specification, are polyester formulations which when cured are self-extinguishing under the standards set forth in ASTM D-635.

Frequently, to achieve fire-retardant characteristics which meet the above ASTM requirement, it is necessary to incorporate phosphorus into the polyester formulation. Generally a minimum amount of phosphorus employed is about 0.5 to about 2.0 percent, depending upon the formulation.

The phosphorus, which contributes to the fire-retardancy may be in the form of a reactive or non-reactive, phosphorus-containing compound, preferably organic phosphorus. The reactive phosphorus may be incorporated into the polyester per se, or may form a portion of the copolymerizable monomer. The nature of the phosphorus compound is in no manner critical and all such materials conventionally employed in the art may be employed in the polyester compositions of the invention. A great many phosphorus-containing materials which may be incorporated in the polyester formulations to achieve fire-retardancy are known in the art. These materials may be found in U.S. patents and pertinent scientific texts and scientific publications. To enumerate at length all the possible materials is deemed unnecessary since one need merely refer to the art to determine what materials are available. Typical materials include bis(chloroethyl)chloroethyl phosphonate, bis(chloropropyl)chloropropyl phosphonate, tris(dichloropropyl)phosphonate and tris(chloropropyl)phosphate, as well as tris(chloroethyl)phosphate.

Other phosphorus-containing materials include: tris(hydroxypropyl)phosphate, tris[octakis(2-hydroxypropyl)sucrose]phosphite, tris(dipropylene glycol)phosphite, tris[tetra-kis(2-hydroxypropyl)-α-methyl glycoside]phosphite.

An example of a copolymerizable monomer of phosphonate is bis(beta-chloroethyl)vinyl phosphate.

The smoke suppressant, particulate organic carboxylic acid employed in the process of the invention is preferably fumaric acid; however, virtually any particulate organic carboxylic acid, preferably containing 20 carbon atoms or less and, more preferably, 10 carbon atoms or less, may be employed. Examples of such acids include: oxalic acid, maleic acid, citric acid, benzoic acid, maleic anhydride, chlorendic anhydride, adipic acid, trimellitic acid and pyromellitic acid. The acid may be incorporated in polyester formulation in particulate form at any point following the preparation of the polyester resin (a), that is, after the reaction of the ethylenically unsaturated polycarboxylic acids and the polyhydric alcohols to form the polyester. Preferably, it is added at or about room temperature since it is preferable that at least a portion of the organic carboxylic acid remain in particulate form in the polyester resin upon curing. For that reason, it may be preferable to add the organic carboxylic acid just prior to or at any time of use, for example, when the catalyst is added.

The amount of particulate carboxylic acid employed in the polyesters of this invention is that amount which is an effective smoke-diminishing amount. Generally, about 5 to about 40 percent by weight of the total composition is employed. Preferably about 10 to about 25 percent by weight of the total composition is employed.

Set forth below is a specific example of the invention. This example is illustrative and is not to be construed as limiting. All parts and percentages are by weight unless otherwise specified, as is true throughout the specification.

EXAMPLE

The unsaturated polyester employed in this example was prepared from 6.88 moles of tetrachlorophthalic anhydride, 3.12 moles of maleic anhydride and 10.5 moles of ethylene glycol and has an acid number of 35, an alkyd viscosity of F+ (Gardner-Holdt). The final unsaturated polyester composition contained 65 parts of the above reaction product, 35 parts of styrene and 0.008 part of methyl hydroquinone.

Compositions were formulated as follows:

| Blend: | A | B | C | D | E | F |
|---|---|---|---|---|---|---|
| Polyester | 500 | 425 | 425 | 425 | 425 | 425 |
| 12% cobalt octoate | 1.5 | 1.3 | 1.3 | 1.3 | 1.3 | 1.3 |
| Then add: | | | | | | |
| Fumaric acid | — | 75 | — | — | — | — |
| Adipic Acid | — | — | 75 | — | — | — |
| Chlorendic acid | — | — | — | 75 | — | — |
| Succinic acid | — | — | — | — | 75 | — |
| Maleic acid | — | — | — | — | — | 75 |
| Mix well, Add: | | | | | | |
| Methyl ethyl ketone peroxide | 7.5 | 7.5 | 7.5 | 7.5 | 7.5 | 7.5 |
| Gel time | 8:20 | 7:00 | 6:55 | 5:05 | 7:32 | 6:22 |

The above, after adding peroxide, were mixed one minute, then poured into molds formed from transite panels edged with three-quarter inch high aluminum tape.

The polyester panels were tested in the Montsanto Small Tunnel Test. The results were as follows:

| | A | B | C | D | E | F |
|---|---|---|---|---|---|---|
| Flame spread rating | 104 | 92 | 100 | 100 | 104 | 104 |
| Smoke evolution | Very heavy | Heavy-but noticably reduced over Control A | | | | |

Various other polyester resins described hereinabove with varying amounts of different polycarboxylic acids such as those hereinabove set forth may be employed to obtain equivalent results.

According to the provisions of the Patent Statutes, there are described above the invention and what are now considered to be its best embodiments. However, within the scope of the appended claims, it is to be understood that the invention may be practiced otherwise than as specifically described.

We claim:

1. A polymerizable composition comprising:
    A. a polyester of an ethylenically-unsaturated polycarboxylic acid and a polyhydric alcohol;
    B. a liquid, polymerizable, ethylenically-unsaturated compound; and
    C. a smoke-inhibiting amount, at least about 10 percent by weight of the total composition, of a particulate organic carboxylic acid, at least a portion of which remains in particulate form when said polymerizable composition is subsequently cured.

2. A polymerizable composition as in claim 1 wherein the acid (C) is an acid containing 10 carbon atoms or less.

3. A polymerizable composition as in claim 1 wherein the acid (C) is selected from the group consisting of fumaric acid, adipic acid, chlorendic acid, succinic acid and maleic acid.

4. A polymerizable composition as in claim 3 wherein the acid (C) is fumaric acid.

5. A polymerizable composition as in claim 1 wherein the acid (C) is present in an amount of about 10 to about 25 percent by weight of the total composition.

6. A polymerizable composition as in claim 5 wherein the acid (C) is selected from the group consisting of fumaric acid, adipic acid, chlorendic acid, succinic acid and maleic acid.

7. A polymericable composition as in claim 6 wherein the acid (C) is fumaric acid.

8. A polymerizable composition as in claim 1 comprising:
    A. a polyester of an ethylenically-unsaturated, halogenated polycarboxylic acid and a polyhydric alcohol;
    B. a liquid, polymerizable, ethylenically-unsaturated compound; and
    C. a smoke-inhibiting amount, at least about 10 percent by weight of the total composition, of a particulate organic carboxylic acid, at least a portion of which remains in particulate form when said polymerizable composition is subsequently cured.

9. A polymerizable composition as in claim 8 wherein the acid (C) is an acid containing 10 carbon atoms or less.

10. A polymerizable composition as in claim 9 wherein the acid (C) is selected from the group consisting of fumaric acid, adipic acid, chlorendic acid, succinic acid and maleic acid.

11. A polymerizable composition as in claim 10 wherein the acid (C) is fumaric acid.

12. A polymerizable composition as in claim 8 wherein the acid (C) is present in an amount of about 10 to about 25 percent by weight of the total composition.

13. A polymerizable composition as in claim 12 wherein the acid (C) is selected from the group consisting of fumaric acid, adipic acid, chlorendic acid, succinic acid and maleic acid.

14. A polymerizable composition as in claim 13 wherein the acid (C) is fumaric acid.

15. A polymerizable composition as in claim 1 comprising:
    A. a polyester of an ethylenically-unsaturated, helogenated polycarboxylic acid and a polyhydric alcohol;
    B. a liquid, polymerizable, ethylenically-unsaturated compound;
    C. a smoke-inhibiting amount at least about 10 percent by weight of the total composition of a particulate organic carboxylic acid, at least a portion of which remains in particulate form when said polymerizable composition is subsequently cured; and
    D. said composition containing sufficient organic phosphorus to render the final composition self-extinguishing.

16. A polymerizable composition as in claim 15 wherein the acid (C) is fumaric acid.

17. A cured, unsaturated polyester composition comprising the copolymerization product of:
    A. a polyester of an ethylenically-unsaturated polycarboxylic acid and a polyhydric alcohol, and
    B. a liquid, copolymerizable ethylenically unsaturated compound,
    having dispersed therein a smoke-inhibiting amount, at least 10 percent by weight of the total composition, of a particulate organic carboxylic acid.

18. A cured, unsaturated polyester resin as in claim 17 wherein the particulate acid is selected from the group consisting of fumaric acid, adipic acid, chlorendic acid, succinic acid and maleic acid.

19. A cured, unsaturated polyester resin as in claim 18 wherein the particulate acid is fumaric acid.

20. A cured, unsaturated polyester resin as in claim 17 wherein the particulate acid is present in an amount of about 10 to about 25 percent by weight of the total composition.

21. A cured, unsaturated polyester resin as in claim 20 wherein the particulate acid contains 10 carbon atoms or less.

22. A cured, unsaturated polyester resin as in claim 21 wherein the particulate acid is selected from the group consisting of fumaric acid, adipic acid chlorendic acid, succinic acid and maleic acid.

23. A cured, unsaturated polyester resin as in claim 22 wherein the particulate acid is fumaric acid.

24. A cured, unsaturated polyester resin as in claim 17 which is a cured halogenated unsaturated polyester composition.

25. A cured, halogenated, unsaturated polyester resin as in claim 24 wherein the particulate acid is present in an amount of about 10 to about 25 percent by weight of the total composition.

26. A cured, halogenated, unsaturated polyester resin as in claim 25 wherein the particulate acid is fumaric acid.

27. A cured, halogenated, unsaturated polyester composition as in claim 26 wherein said composition contains sufficient organic phosphorous to render the final composition self-extinguishing.

* * * * *